(12) United States Patent
Koseoglu et al.

(10) Patent No.: US 11,484,868 B2
(45) Date of Patent: Nov. 1, 2022

(54) MODIFIED LARGE CRYSTALLITE USY ZEOLITE FOR HYDROCRACKING HYDROCARBON OIL

(71) Applicants: Saudi Arabian Oil Company, Dhahran (SA); JGC Catalysts and Chemicals Ltd., Kawasaki (JP); Japan Cooperation Center Petroleum, Tokyo (JP)

(72) Inventors: Omer Refa Koseoglu, Dhahran (SA); Robert Peter Hodgkins, Dhahran (SA); Mitsunori Watabe, Kanagawa (JP); Koji Uchida, Kanagawa (JP)

(73) Assignees: Saudi Arabian Oil Company, Dhahran (SA); JGC Catalysts and Chemicals Ltd., Kawasaki (JP); Japan Cooperation Center Petroleum, Tokyo (JP)

( * ) Notice: Subject to any disclaimer, the term of this patent is extended or adjusted under 35 U.S.C. 154(b) by 129 days.

(21) Appl. No.: 17/038,074

(22) Filed: Sep. 30, 2020

(65) Prior Publication Data

US 2022/0097031 A1    Mar. 31, 2022

(51) Int. Cl.
| | |
|---|---|
| B01J 35/00 | (2006.01) |
| B01J 29/08 | (2006.01) |
| C10G 47/20 | (2006.01) |
| B01J 35/10 | (2006.01) |
| B01J 37/04 | (2006.01) |
| B01J 37/08 | (2006.01) |

(52) U.S. Cl.
CPC ........... *B01J 29/088* (2013.01); *B01J 35/006* (2013.01); *B01J 35/1014* (2013.01); *B01J 35/1023* (2013.01); *B01J 35/1038* (2013.01); *B01J 35/1042* (2013.01); *B01J 35/1066* (2013.01); *B01J 37/04* (2013.01); *B01J 37/08* (2013.01); *C10G 47/20* (2013.01); *C10G 2300/1074* (2013.01); *C10G 2300/202* (2013.01); *C10G 2300/301* (2013.01); *C10G 2300/308* (2013.01); *C10G 2300/4006* (2013.01); *C10G 2300/4012* (2013.01); *C10G 2300/4018* (2013.01)

(58) Field of Classification Search
CPC ...... B01J 29/088; B01J 29/106; B01J 29/126; B01J 29/146; C10G 47/16–20
See application file for complete search history.

(56) References Cited

U.S. PATENT DOCUMENTS

| | | | |
|---|---|---|---|
| 3,240,694 A | 3/1966 | Mason et al. | |
| 4,255,288 A | 3/1981 | Cull et al. | |
| 4,544,538 A | 10/1985 | Zones | |
| 4,713,167 A | 12/1987 | Reno et al. | |
| 4,950,384 A | 8/1990 | Groeneveld et al. | |
| 5,026,472 A | 6/1991 | Hoehn et al. | |
| 5,358,918 A * | 10/1994 | Yukang | C10G 11/05 502/67 |
| 5,716,593 A * | 2/1998 | Miller | B01J 29/126 423/709 |
| 5,885,440 A | 3/1999 | Hoehn et al. | |
| 6,113,775 A | 9/2000 | Christolini et al. | |
| 6,132,594 A | 10/2000 | Okazaki et al. | |
| 6,217,746 B1 | 4/2001 | Thakkar et al. | |
| 6,284,218 B1 * | 9/2001 | Kuvettu | C01B 39/20 423/709 |
| 6,312,586 B1 | 11/2001 | Kalnes et al. | |
| 6,709,644 B2 | 3/2004 | Zones et al. | |
| 6,726,834 B2 | 4/2004 | Quesada et al. | |
| 8,002,970 B2 | 8/2011 | Euzen et al. | |
| 9,221,036 B2 | 12/2015 | Koseoglu et al. | |
| 10,081,009 B2 | 9/2018 | Koseoglu et al. | |
| 10,293,332 B2 | 5/2019 | Koseoglu et al. | |
| 10,357,761 B2 | 7/2019 | Koseoglu et al. | |
| 2009/0118556 A1 | 5/2009 | Euzen et al. | |
| 2009/0283443 A1 | 11/2009 | Kuroda et al. | |
| 2013/0175202 A1 | 7/2013 | Koseoglu et al. | |
| 2018/0169602 A1 | 6/2018 | Harandi et al. | |
| 2018/0361366 A1 | 12/2018 | Zhang et al. | |

FOREIGN PATENT DOCUMENTS

| | | |
|---|---|---|
| JP | H07308581 A | 11/1995 |
| WO | 2012018819 A1 | 2/2012 |
| WO | 2015179735 A1 | 11/2015 |

OTHER PUBLICATIONS

International Search Report and Written Opinion dated May 3, 2021 pertaining to International application No. PCT/US2020/058211 filed Oct. 30, 2020, 15 pgs.
Cui, Q. et al. "Role of the Zeolite Crystallite Size on Hydrocracking of Vacuum Gas Oil over NiW/Y-ASA Catalysts", Energy & Fuels, vol. 26, No. 8, Aug. 16, 2012, pp. 4664-4670.

* cited by examiner

Primary Examiner — Renee Robinson
(74) Attorney, Agent, or Firm — Dinsmore & Shohl LLP (57) ABSTRACT

In accordance with one or more embodiments of the present disclosure, a catalyst composition includes a catalyst support and at least one hydrogenative component disposed on the catalyst support. The catalyst support includes at least one USY zeolite having a framework substituted with titanium and/or zirconium and/or hafnium. The framework-substituted USY zeolite has an average crystallite size from 5 μm to 50 μm. Methods of making and using such a catalyst in a hydrocracking process are also disclosed.

20 Claims, 4 Drawing Sheets

MODIFIED LARGE CRYSTALLITE USY ZEOLITE FOR HYDROCRACKING HYDROCARBON OIL

FIELD

Embodiments of the present disclosure generally relate to hydrocracking of hydrocarbon oil, and pertain particularly to a catalyst composition for hydrocracking of hydrocarbon oil, methods of making such catalyst compositions, and methods of using such catalyst compositions.

TECHNICAL BACKGROUND

Hydrocracking processes are used commercially in a large number of petroleum refineries to process a variety of hydrocarbon feeds boiling in the range of 370° C. to 520° C. in conventional hydrocracking units and boiling at 520° C. and above in residue hydrocracking units. In general, hydrocracking processes split the molecules of the hydrocarbon feed into smaller, i.e., lighter, molecules having higher average volatility and economic value. Additionally, hydrocracking processes typically improve the quality of the hydrocarbon feedstock by increasing the hydrogen-to-carbon ratio and by removing organosulfur and organonitrogen compounds. The hydrocracking catalyst is a key feature of hydrocracking process technologies.

Two types of catalysts used in hydrocracking: pretreat catalysts and cracking catalysts. Pretreat catalysts are designed to remove contaminants, such as sulfur and nitrogen, from the heavy hydrocarbon oil. Cracking catalysts are designed to split low-value heavy molecules into higher value transportation fuels. The cracking catalysts are typically composed of active phase metals for hydrogenation, amorphous support as a binder, and zeolites as a cracking component. Active phase metals typically include nickel, molybdenum, and tungsten. Exemplary zeolites include ultra-stable Y-type zeolites (USY zeolites).

SUMMARY

There is a continual need for more effective hydrocracking catalyst compositions. It has been discovered that a catalyst composition including at least one ultra-stable Y-type (hereinafter "USY") zeolite framework-substituted with titanium, zirconium, hafnium, or a combination of two or more thereof, having an average crystallite size from 5 µm to 50 µm, may greatly enhance the effectiveness of hydrocracking processes.

According to one embodiment, a catalyst composition includes at least one hydrogenative metal component and a support. The support comprises a framework-substituted ultra-stable Y-type (USY) zeolite substituted with zirconium atoms, titanium ions, or both zirconium atoms and titanium atoms. The framework-substituted USY zeolite has an average crystallite size from 5 µm to 50 µm.

According to one embodiment, a method of making a catalyst composition includes forming an ultra-stable Y-type (USY) zeolite having an average crystallite size from 5 µm to 50 µm; heating the USY zeolite at a temperature from 500° C. to 700° C.; forming a suspension comprising the USY zeolite, the suspension having a liquid/solid ratio from 5 to 15; adding at least one inorganic acid, at least one organic acid, or a mixture of at least one inorganic acid and at least one organic acid to the suspension such that the suspension comprises a pH less than or equal to 2; mixing a zirconium compound, a titanium compound, a hafnium compound, or a mixture of two or more thereof with the suspension comprising a pH less than or equal to 2; and adding a base such that the suspension comprises a pH from 6 to 8 to afford a framework-substituted USY zeolite.

According to one embodiment, a method for hydrocracking hydrocarbon oil includes contacting the hydrocarbon oil with at least one catalyst composition and hydrogen in a reactor in order to hydrocrack the hydrocarbon oil. The catalyst composition includes at least one hydrogenative metal component and a support. The support comprises a framework-substituted ultra-stable Y-type (USY) zeolite substituted with zirconium atoms, titanium ions, or both zirconium atoms and titanium atoms. The framework-substituted USY zeolite has an average crystallite size from 5 µm to 50 µm.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

In embodiments, a catalyst composition includes a catalyst support and at least one hydrogenative component disposed on the catalyst support. The catalyst support includes at least one USY zeolite having a framework substituted with titanium and/or zirconium and/or hafnium (hereinafter "FS-USY zeolite"). The FS-USY zeolite has an average crystallite size from 5 µm to Embodiments will now be described in further detail.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), deasphalted oil (DAO) obtained from a solvent deasphalting process, demetallized oil (DMO), light and/or heavy coker gas oil obtained from a coker process, cycle oil obtained from a fluid catalytic cracking (FCC) process, and gas oil obtained from a visbreaking process.

As used herein, the term "hydrocarbon" refers to a chemical compound composed entirely of carbon and hydrogen atoms.

As used herein, the term "crystal lattice constant" refers to a physical dimension of unit cells in a crystal lattice. The crystal lattice constant can be determined by ASTM D3942-03, entitled "Standard Test Method for Determination of the Unit Cell Dimension of a Faujasite-Type Zeolite," the entire content of which is incorporated herein by reference.

As used herein, the term "specific surface area" refers to the total surface area of the zeolite per unit of mass. The specific surface area can be determined by ASTM D3663-03, entitled "Standard Test Method for Surface Area of Catalysts and Catalyst Carriers," the entire content of which is incorporated herein by reference. Alternatively, the specific surface area may be determined using the Brunauer-Emmett-Teller ("BET") model. Alternatively, the specific surface area can be determined by ASTM D4365-19, entitled "Standard Test Method for Determining Micropore Volume and Zeolite Area of a Catalyst," the entire content of which is incorporated herein by reference.

As used herein, the term "hydrogen/oil ratio" or "hydrogen-to-oil ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed using standard flow meters.

As used herein, the term "liquid hourly space velocity" or "LHSV" refers to the ratio of the liquid flow rate of the hydrocarbon feed to the catalyst volume or mass.

As used herein, the term "activity of the catalyst" or "catalytic activity" refers to the increase in the rate of the hydrocracking process due to the presence of the catalyst and may be approximated by the temperature at which 50% conversion of the feedstock is converted. A more highly active catalyst will have a lower such temperature.

In one aspect, a catalyst composition may include a catalyst support and at least one hydrogenative component. In embodiments, the catalyst composition may comprise from 60 wt. % to 99.99 wt. % support. For example, the catalyst composition may comprise from 65 wt. % to 95 wt. %, from 60 wt. % to 90 wt. %, from 65 wt. % to 85 wt. %, or even from 70 wt. % to 80 wt. % support. It should be understood that the catalyst composition may comprise an amount of the support in a range formed from any of the lower bounds for such a range described herein to any of the upper bounds for such a range described herein. In embodiments, the catalyst composition may comprise from 0.01 wt. % to 40 wt. % hydrogenative component. For example, the catalyst composition may comprise from 1 wt. % to 40 wt. %, from 5 wt. % to 35 wt. %, from 10 wt. % to 30 wt. %, or even from 15 wt. % to 25 wt. % hydrogenative component. It should be understood that the catalyst composition may comprise an amount of the hydrogenative component in a range formed from any of the lower bounds for such a range described herein to any of the upper bounds for such a range described herein. Without intending to be bound by any particular theory, it is believed that hydrogenation metal dispersion on the catalyst is not optimum when the amount of hydrogenative component in the catalyst composition is too large relative to the amount of support. For example, the hydrogenation metal may agglomerate on the support when the catalyst composition comprises more than 40 wt. % hydrogenative component.

The catalyst support may include at least one USY zeolite, which may have a framework substituted with titanium and/or zirconium and/or hafnium. In embodiments, the catalyst support may include from 0.1 wt. % to 90 wt. % FS-USY zeolite. For example, the catalyst support may comprise from 0.1 wt. % to 85 wt. %, from 5 wt. % to 80 wt. %, from 10 wt. % to 75 wt. %, from 15 wt. % to 70 wt. %, from 20 wt. % to 65 wt. %, from 25 wt. % to 60 wt. %, from 30 wt. % to 55 wt. %, from 35 wt. % to 50 wt. %, or even from 40 wt. % to 45 wt. % FS-USY zeolite. It should be understood that the catalyst support may comprise an amount of the FS-USY zeolite in a range formed from any of the lower bounds for such a range described herein to any of the upper bounds for such a range described herein. Without intending to be bound by any particular theory, it is believed that when the amount of zeolite in the catalyst support is above 90%, forming a catalyst pellet/extrudate is limited.

In embodiments, the framework substitution may be accomplished by a post-modification process in which the zeolite is subjected to dealumination followed by insertion of transition metals, such as Ti and/or Zr and/or Hf. As a result, a zeolite that has been framework-substituted with titanium and/or zirconium and/or hafnium may have a greater silica-to-alumina molar ratio (hereinafter "SAR") relative to the unsubstituted zeolite. Without intending to be bound by any particular theory, it is believed that this post-modification generates mesoporosity, which as used herein refers to having pores with diameters from 2 nm to 50 nm, which imbues the zeolite with the ability to accept large molecules inside the pores. Also, this post-modification process is believed to increase the number of medium-strength acid sites while decreasing the number of strong acid sites and to enhance the dispersion of the hydrogenative metal on the catalyst surface.

In embodiments, post-modification of the USY zeolite may be accomplished by the following process. The zeolite may be placed in a suspension in a liquid, such that the ratio of the mass of the liquid to the solid zeolite is from 5 to 15. An inorganic acid or organic acid may be added to the suspension so that the suspension has a pH of less than 2. At least one zirconium compound and/or at least one titanium compound and/or at least one hafnium compound are added to this acidic suspension, which is then mixed and neutralized to secure the post-modified catalyst. An exemplary process for preparing a USY zeolite framework substituted with titanium and/or zirconium and/or hafnium is described in U.S. Pat. No. 10,293,332, the entire content of which is incorporated herein by reference. Framework substitution may be monitored, for example, by ultraviolet, visible, and near-infrared spectrophotometry (UV-Vis-NIR or UV-vis), Fourier transform infrared spectroscopy (FT-IR), or nuclear magnetic resonance spectrometry (NMR).

In embodiments, the USY zeolite may be independently substituted with from 0.1 wt. % to 5 wt. % zirconium and/or from 0.1 wt. % to 5 wt. % titanium and/or from 0.1 wt. % to 5 wt. % hafnium, calculated on an oxide basis. That is, in embodiments, one or more of the zirconium, titanium, and hafnium, may not be included, although at least one of the zirconium, titanium, and hafnium is included. For instance, the USY zeolite may be substituted with zirconium only, titanium only, hafnium only, both zirconium and titanium, both zirconium and hafnium, both titanium and hafnium, or all three of zirconium, titanium, and hafnium.

In embodiments in which zirconium is present, the USY zeolite may include from 0.1 wt. % to 5 wt. % zirconium, from 0.5 wt. % to 4.5 wt. % zirconium, from 0.5 wt. % to 4 wt. % zirconium, from 0.5 wt. % to 3.5 wt. % zirconium, from 0.5 wt. % to 3 wt. % zirconium, from 0.5 wt. % to 2.5 wt. % zirconium, from 0.5 wt. % to 2 wt. % zirconium, from 0.5 wt. % to 1.5 wt. % zirconium, from 0.5 wt. % to 1 wt. % zirconium, from 1 wt. % to 4 wt. % zirconium, from 1 wt. % to 3.5 wt. % zirconium, from 1 wt. % to 3 wt. % zirconium, from 1 wt. % to 2.5 wt. % zirconium, or even from 1 wt. % to 2 wt. % zirconium.

In the same or in different embodiments, the USY zeolite may be substituted with from 0.5 wt. % to 4.5 wt. % titanium, from 0.5 wt. % to 4 wt. % titanium, from 0.5 wt. % to 3.5 wt. % titanium, from 0.5 wt. % to 3 wt. % titanium, from 0.5 wt. % to 2.5 wt. % titanium, from 0.5 wt. % to 2 wt. % titanium, from 0.5 wt. % to 1.5 wt. % titanium, from 0.5 wt. % to 1 wt. % titanium, from 1 wt. % to 4 wt. % titanium, from 1 wt. % to 3.5 wt. % titanium, from 1 wt. % to 3 wt. % titanium, from 1 wt. % to 2.5 wt. % titanium, or even from 1 wt. % to 2 wt. % titanium.

In the same or in different embodiments, the USY zeolite may be substituted with from 0.5 wt. % to 4.5 wt. % hafnium, from 0.5 wt. % to 4 wt. % hafnium, from 0.5 wt. % to 3.5 wt. % hafnium, from 0.5 wt. % to 3 wt. % hafnium, from 0.5 wt. % to 2.5 wt. % hafnium, from 0.5 wt. % to 2 wt. % hafnium, from 0.5 wt. % to 1.5 wt. % hafnium, from 0.5 wt. % to 1 wt. % hafnium, from 1 wt. % to 4 wt. % hafnium, from 1 wt. % to 3.5 wt. % hafnium, from 1 wt. % to 3 wt. % hafnium, from 1 wt. % to 2.5 wt. % hafnium, or even from 1 wt. % to 2 wt. % hafnium.

It should be understood that any amount of zirconium-substitution described herein can be used in conjunction with any amount of titanium-substitution described herein and any amount of hafnium described herein, including in an amount of 0 wt. % of any one or two of zirconium, titanium, and hafnium. Further, it should be understood that the range of zirconium substitution or titanium substitution or hafnium substitution may be formed from any of the lower bounds of such substitution described herein and any of the upper bounds of such substitution described herein.

Without intending to be bound by any particular theory, it is believed the addition of the zirconium compound and/or the titanium compound and/or the hafnium compound at an amount of less than 0.1 wt. % fails to improve the solid acid properties of the zeolite. Conversely, the addition of the zirconium compound and/or the titanium compound and/or the hafnium compound in an amount exceeding 5 wt. % does not improve the zeolite activity further and may create an unnecessary increase in cost of the resulting catalyst.

In embodiments, the FS-USY zeolite may have a crystal lattice constant from 2.42 nm to 2.45 nm. For example, the crystal lattice constant of the FS-USY zeolite may be from 2.42 nm to 2.449 nm, from 2.42 nm to 2.448 nm, from 2.42 nm to 2.447 nm, from 2.42 nm to 2.446 nm, from 2.42 nm to 2.445 nm, from 2.42 nm to 2.444 nm, from 2.42 nm to 2.443 nm, from 2.42 nm to 2.442 nm, from 2.42 nm to 2.441 nm, from 2.42 nm to 2.44 nm, from 2.42 nm to 2.439 nm, from 2.42 nm to 2.438 nm, from 2.42 nm to 2.437 nm, from 2.42 nm to 2.436 nm, from 2.42 nm to 2.435 nm, from 2.421 nm to 2.45 nm, from 2.422 nm to 2.45 nm, from 2.423 nm to 2.45 nm, from 2.424 nm to 2.45 nm, from 2.425 nm to 2.45 nm, from 2.426 nm to 2.45 nm, from 2.427 nm to 2.45 nm, from 2.428 nm to 2.45 nm, from 2.429 nm to 2.45 nm, from 2.43 nm to 2.45 nm, from 2.431 nm to 2.45 nm, from 2.432 nm to 2.45 nm, from 2.433 nm to 2.45 nm, from 2.434 nm to 2.45 nm, or even from 2.435 nm to 2.45 nm. It should be understood that the crystal lattice constant of the FS-USY zeolite may be in a range formed from any one of the lower bounds for such crystal lattice constant described herein to any one of the upper bounds for such crystal lattice constant described herein.

Without intending to be bound by any particular theory, it is believed that a crystal lattice constant for the FS-USY zeolite of less than 2.42 nm may result in a reduction in the activity of the ultimately formed hydrocracking catalyst. Such reduction is believed to be the result of a high $SiO_2/Al_2O_3$ molar ratio in the framework structure of the USY zeolite and a small number of solid acid sites serving as active sites for the decomposition of hydrocarbons. Conversely, a crystal lattice constant for the FS-USY zeolite exceeding 2.45 nm may result in breakage of the crystal structure of the FS-USY zeolite during a hydrocracking reaction because of a low heat resistance of the FS-USY zeolite. The breakage of the crystal structure of the FS-USY zeolite may result in a reduction in the activity of the ultimately formed hydrocracking catalyst composition.

In embodiments, the FS-USY zeolite may have a specific surface area from 600 $m^2/g$ to 900 $m^2/g$. For example, the specific surface area of the FS-USY may be from 600 $m^2/g$ to 890 $m^2/g$, from 600 $m^2/g$ to 880 $m^2/g$, from 600 $m^2/g$ to 870 $m^2/g$, from 600 $m^2/g$ to 860 $m^2/g$, from 600 $m^2/g$ to 850 $m^2/g$, from 600 $m^2/g$ to 840 $m^2/g$, from 600 $m^2/g$ to 830 $m^2/g$, from 600 $m^2/g$ to 820 $m^2/g$, from 600 $m^2/g$ to 810 $m^2/g$, from 600 $m^2/g$ to 800 $m^2/g$, from 610 $m^2/g$ to 900 $m^2/g$, from 620 $m^2/g$ to 900 $m^2/g$, from 630 $m^2/g$ to 900 $m^2/g$, from 640 $m^2/g$ to 900 $m^2/g$, from 650 $m^2/g$ to 900 $m^2/g$, from 660 $m^2/g$ to 900 $m^2/g$, from 670 $m^2/g$ to 900 $m^2/g$, from 680 $m^2/g$ to 900 $m^2/g$, from 690 $m^2/g$ to 900 $m^2/g$, or even from 700 $m^2/g$ to 900 $m^2/g$. It should be understood that the specific surface area of the FS-USY zeolite may be in a range formed from any one of the lower bounds for such specific surface area described herein to any one of the upper bounds for such specific surface area described herein. Without intending to be bound by any particular theory, it is believed that a specific surface area of the FS-USY zeolite of less than 600 $m^2/g$ may result in a reduction in the number of available solid acid sites, thereby reducing the catalyst activity of the resulting hydrocracking catalyst composition to an unsatisfactory level.

In embodiments, the catalyst composition comprising the FS-USY zeolite may have a specific surface area from 200 $m^2/g$ to 450 $m^2/g$. For example, the specific surface area of the catalyst composition comprising the FS-USY zeolite may be from 210 $m^2/g$ to 450 $m^2/g$, from 220 $m^2/g$ to 450 $m^2/g$, from 230 $m^2/g$ to 450 $m^2/g$, from 240 $m^2/g$ to 450 $m^2/g$, from 250 $m^2/g$ to 450 $m^2/g$, from 200 $m^2/g$ to 440 $m^2/g$, from 200 $m^2/g$ to 430 $m^2/g$, from 200 $m^2/g$ to 420 $m^2/g$, from 200 $m^2/g$ to 410 $m^2/g$, or even from 200 $m^2/g$ to 400 $m^2/g$. It should be understood that the specific surface area of the catalyst composition comprising the FS-USY zeolite may be in a range formed from any one of the lower bounds for such specific surface area described herein to any one of the upper bounds for such specific surface area described herein. Without intending to be bound by any particular theory, it is believed that the hydrocracking rate is reduced when the specific surface area is less than 200 $m^2/g$, and the yield of the middle distillate is reduced. If, however, the specific surface area exceeds 450 $m^2/g$, the hydrocracking rate may grow too high, and the product selectivity may be changed unfavorably.

In embodiments, the FS-USY zeolite may have a molar ratio of $SiO_2$ to $Al_2O_3$ from 5 to 100. For example, the FS-USY zeolite may have a molar ratio of $SiO_2$ to $Al_2O_3$ from 5 to 99, from 5 to 98, from 5 to 97, from 5 to 96, from 5 to 95, from 5 to 94, from 5 to 93, from 5 to 92, from 5 to 91, from 5 to 90, from 5 to 89, from 5 to 88, from 5 to 87, from 5 to 86, from 5 to 85, from 5 to 84, from 5 to 83, from 5 to 82, from 5 to 81, from 5 to 80, from 5 to 79, from 5 to 78, from 5 to 77, from 5 to 76, from 5 to 75, from 5 to 74, from 5 to 73, from 5 to 72, from 5 to 71, from 5 to 70, from 5 to 69, from 5 to 68, from 5 to 67, from 5 to 66, from 5 to 65, from 5 to 64, from 5 to 63, from 5 to 62, from 5 to 61, from 5 to 60, from 5 to 59, from 5 to 58, from 5 to 57, from 5 to 56, from 5 to 55, from 5 to 54, from 5 to 53, from 5 to 52, from 5 to 51, from 5 to 50, from 5 to 49, from 5 to 48, from 5 to 47, from 5 to 46, from 5 to 45, from 5 to 44, from 5 to 43, from 5 to 42, from 5 to 41, from 5 to 40, from 6 to 100, from 7 to 100, from 8 to 100, from 9 to 100, from 10 to 100, from 11 to 100, from 12 to 100, from 13 to 100, from 14 to 100, from 15 to 100, from 16 to 100, from 17 to 100, from 18 to 100, from 19 to 100, from 20 to 100, from 21 to 100, from 22 to 100, from 23 to 100, from 24 to 100, from 25 to 100, from 26 to 100, from 27 to 100, from 28 to 100, from 29 to 100, from 30 to 100, from 31 to 100, from 32 to 100, from 33 to 100, from 34 to 100, from 35 to 100, from 36 to 100, from 37 to 100, from 38 to 100, from 39 to 100, from 40 to 100, from 41 to 100, from 42 to 100, from 43 to 100, from 44 to 100, from 45 to 100, from 46 to 100, from 47 to 100, from 48 to 100, from 49 to 100, or even from 50 to 100. It should be understood that the ratio of $SiO_2$ to $Al_2O_3$ of the FS-USY zeolite may be in a range formed from any one of the lower bounds for such ratio described herein to any one of the upper bounds for such ratio described herein.

Without intending to be bound by any particular theory, it is believed that a silica-alumina molar ratio of the FS-USY zeolite of less than 5 may have high acidic sites possessing high acid strength and is thus liable to cause a reduction in activity in hydrogenation and hydrocracking of the ultimately formed hydrocracking catalyst. Additionally, a larger alumina content is associated with lower stability of the FS-USY. Conversely, a silica-alumina ratio of the FS-USY zeolite exceeding 100 may result in a reduction in hydrocracking activity in a decomposition reactor of the ultimately prepared hydrocracking catalyst because of a small number of solid acid sites effective for a hydrocracking.

In embodiments, the catalyst composition comprising the FS-USY zeolite may include a plurality of pores having a diameter of 600 Å or less. These pores having a diameter of 600 Å or less have a volume from 0.4 ml/g to 0.75 ml/g. For example the pore volume may be in the range from 0.4 ml/g to 0.74 ml/g, from 0.4 ml/g to 0.73 ml/g, from 0.4 ml/g to 0.72 ml/g, from 0.4 ml/g to 0.71 ml/g, from 0.4 ml/g to 0.7 ml/g, from 0.4 ml/g to 0.69 ml/g, from 0.4 ml/g to 0.68 ml/g, from 0.4 ml/g to 0.67 ml/g, from 0.4 ml/g to 0.66 ml/g, from 0.4 ml/g to 0.65 ml/g, from 0.41 ml/g to 0.75 ml/g, from 0.42 ml/g to 0.75 ml/g, from 0.43 ml/g to 0.75 ml/g, from 0.44 ml/g to 0.75 ml/g, from 0.45 ml/g to 0.75 ml/g, from 0.46 ml/g to 0.75 ml/g, from 0.47 ml/g to 0.75 ml/g, from 0.48 ml/g to 0.75 ml/g, from 0.49 ml/g to 0.75 ml/g, or even from 0.5 ml/g to 0.75 ml/g. It should be understood that the pore volume of pores of the catalyst composition comprising the FS-USY zeolite having a diameter of 600 Å or less may be in a range formed from any one of the lower bounds for such pore volume described herein to any one of the upper bounds for such pore volume described herein.

Without intending to be bound by any particular theory, it is believed that the specific surface area is reduced if the pore volume is less than 0.40 ml/g. As a result, the hydrocracking catalyst activity and yield of the middle distillate are reduced. Conversely, if the pore volume exceeds 0.75 ml/g, the specific surface area is elevated. As a result, the hydrocracking rate and the product selectivity may be changed unfavorably.

In embodiments, the catalyst composition may include other additives. For instance, the catalyst composition may include one or more inorganic oxide in addition to the zeolite described above. The inorganic oxide may act as a granulating agent or a binder. Exemplary inorganic oxides include, but are not limited to, alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

In embodiments, the one or more inorganic oxide may be a component of the catalyst support. In embodiments having both a FS-USY zeolite and an inorganic oxide, the FS-USY zeolite present may comprise from 1 wt. % to 90 wt. %, from 1 wt. % to 85 wt. %, from 1 wt. % to 80 wt. %, from 10 wt. % to 75 wt. %, from 20 wt. % to 70 wt. %, or even from 30 wt. % to 60 wt. % of the support. In such embodiments, the inorganic oxide content may comprise from 99 wt. % to 10 wt. %, from 99 wt. % to 15 wt. %, from 99 wt. % to 20 wt. %, from 90 wt. % to 25 wt. %, from 80 wt. % to 30 wt. %, or even from 70 wt. % to 40 wt. % of the support. It should be understood that the FS-USY zeolite may be present in a range formed from any one of the lower bounds for such concentration described herein to any one of the upper bounds for such concentration described herein. It should be further understood that the inorganic oxide may be present in a range formed from any one of the lower bounds for such concentration described herein to any one of the upper bounds for such concentration described herein. Without intending to be bound by any particular theory, it is believed that the catalyst may not have sufficient mechanical strength if the inorganic oxide content falls below 10 wt. %. Further, it is believed that the catalyst may not have sufficient cracking capabilities if the zeolite content falls below 1 wt. %.

A sample of zeolites will have a distribution of crystallite sizes with a peak concentration of one crystallite size. As used herein, the term "average crystallite size" refers to the most probable crystallite size in a sample of zeolites. For instance, FIG. 5, discussed more fully in the Examples below, provides the crystallite size distribution for both conventionally sized FS-USY zeolites and large crystallite FS-USY zeolites. Conventionally sized FS-USY typically have an average crystallite size of about 2 μm, as evidenced by size distribution curve (a). However, as evidenced by size distribution curve (b), the FS-USY described herein may have an average crystallite size from 5 μm to 50 μm, from 6 μm to 50 μm, from 7 μm to 50 μm, from 8 μm to 50 μm, from 9 μm to 50 μm, from 10 μm to 50 μm, from 11 μm to 50 μm, from 12 μm to 50 μm, from 13 μm to 50 μm, from 14 μm to 50 μm, from 15 μm to 50 μm, from 16 μm to 50 μm, from 17 μm to 50 μm, from 18 μm to 50 μm, from 19 μm to 50 μm, from 20 μm to 50 μm, from 21 μm to 50 μm, from 22 μm to 50 μm, from 23 μm to 50 μm, from 24 μm to 50 μm, from 25 μm to 50 μm, from 26 μm to 50 μm, from 27 μm to 50 μm, from 28 μm to 50 μm, from 29 μm to 50 μm, from 30 μm to 50 μm, from 5 μm to 49 μm, from 5 μm to 48 μm, from 5 μm to 47 μm, from 5 μm to 46 μm, from 5 μm to 45 μm, from 5 μm to 44 μm, from 5 μm to 43 μm, from 5 μm to 42 μm, from 5 μm to 41 μm, from 5 μm to 40 μm, from 5 μm to 39 μm, from 5 μm to 38 μm, from 5 μm to 37 μm, from 5 μm to 36 μm, from 5 μm to 35 μm, from 5 μm to 34 μm, from 5 μm to 33 μm, from 5 μm to 32 μm, from 5 μm to 31 μm, from 5 μm to 30 μm, from 5 μm to 29 μm, from 5 μm to 28 μm, from 5 μm to 27 μm, from 5 μm to 26 μm, from 5 μm to 25 μm, from 10 μm to 20 μm, from 11 μm to 19 μm, from 12 μm to 18 μm, from 13 μm to 17

µm, or even from 14 µm to 16 µm. It should be understood that the average crystallite size may be in a range formed from any one of the lower bounds for such average crystallite size described to any one of the upper bounds for such average crystallite size described herein.

Without intending to be bound by any particular theory, it is believed that a larger average crystallite size zeolite used in hydrocracking catalyst formulations may provide a more highly active catalyst and provide higher naphtha selectivity when contrasted with catalyst compositions using conventionally sized zeolites. Again, without intending to be bound by any particular theory, it is believed that the larger crystallite size allows the hydrocarbon to have a longer dwell time in the supercage formed by the zeolite, which in turn allows for more robust cracking.

In embodiments, the hydrogenative metal component may comprise a known metal component for use in conventional hydrocracking catalysts. Examples thereof include, but are not limited to, metal components (iron, cobalt, nickel, rhodium, palladium, silver, iridium, platinum or gold) in group 8 of the long periodic table and/or metal components (chromium, molybdenum or tungsten) in group 6. For example, of the hydrogenative metal component may include metal components of the platinum group (platinum, rhodium, palladium and the like) or combinations of molybdenum or tungsten in group 6 and cobalt or nickel in group 8.

In another aspect, a method of making a catalyst composition may include forming a USY zeolite having an average crystallite size from 5 µm to 50 µm, heating the USY zeolite in an oven having a temperature from 500° C. to 700° C., forming a suspension of the thus calcined USY zeolite at a pH of less than 2, mixing a zirconium compound and/or a titanium compound and/or a hafnium compound with the USY zeolite, and neutralizing the resulting suspension to produce a FS-USY zeolite. The resulting catalyst composition is as described above.

A Y-type zeolite may be formed by any method. An exemplary, non-limiting, method follows. An alumina solution is prepared by combining sodium hydroxide with aluminum powder in water. Similarly, a silica solution is prepared by combining sodium hydroxide with colloidal silica. The alumina solution is added to the silica solution while mixing in an ice bath and then held at room temperature for at least 24 hours.

In conventional synthetic methods, the Y-type zeolite is recrystallized under conditions that provide zeolites with an average crystallite size of about 2 µm. For instance, conventional recrystallization is conducted at 60° C. for more than one day. However, in accordance with embodiments described herein, the Y-type zeolite is recrystallized under conditions providing zeolites with an average crystallite size from 5 µm to 50 µm, from 6 µm to 50 µm, from 7 µm to 50 µm, from 8 µm to 50 µm, from 9 µm to 50 µm, from 10 µm to 50 µm, from 11 µm to 50 µm, from 12 µm to 50 µm, from 13 µm to 50 µm, from 14 µm to 50 µm, from 15 µm to 50 µm, from 16 µm to 50 µm, from 17 µm to 50 µm, from 18 µm to 50 µm, from 19 µm to 50 µm, from 20 µm to 50 µm, from 21 µm to 50 µm, from 22 µm to 50 µm, from 23 µm to 50 µm, from 24 µm to 50 µm, from 25 µm to 50 µm, from 26 µm to 50 µm, from 27 µm to 50 µm, from 28 µm to 50 µm, from 29 µm to 50 µm, from 30 µm to 50 µm, from 5 µm to 49 µm, from 5 µm to 48 µm, from 5 µm to 47 µm, from 5 µm to 46 µm, from 5 µm to 45 µm, from 5 µm to 44 µm, from 5 µm to 43 µm, from 5 µm to 42 µm, from 5 µm to 41 µm, from 5 µm to 40 µm, from 5 µm to 39 µm, from 5 µm to 38 µm, from 5 µm to 37 µm, from 5 µm to 36 µm, from 5 µm to 35 µm, from 5 µm to 34 µm, from 5 µm to 33 µm, from 5 µm to 32 µm, from 5 µm to 30 µm, from 5 µm to 29 µm, from 5 µm to 28 µm, from 5 µm to 27 µm, from 5 µm to 26 µm, from 5 µm to 25 µm, from 10 µm to 20 µm, from 11 µm to 19 µm, from 12 µm to 18 µm, from 13 µm to 17 µm, or even from 14 µm to 16 µm. For instance, Table 1 provides time and temperature conditions for obtaining a 5 µm and a 25 µm average crystallite size.

TABLE 1

Exemplary crystallization conditions

| Size (µm) | Temp. (° C.) | Time (min.) |
|---|---|---|
| 5 | 50 | 2520 |
| 5 | 60 | 1221 |
| 5 | 70 | 520 |
| 5 | 80 | 324 |
| 25 | 50 | 3317 |
| 25 | 60 | 1607 |
| 25 | 70 | 812 |
| 25 | 80 | 426 |

A detailed method of preparing the FS-USY zeolite from the Y-type zeolite is provided in U.S. Pat. No. 10,293,332, the entire content of which is incorporated herein by reference.

A Y-type zeolite synthesized by a common method is subjected to exchange of sodium ions with ammonium ions by a conventional method to provide a USY zeolite. For example, a Y-type zeolite is dispersed in water to prepare a suspension and ammonium sulfate is added thereto. The solid matter is washed with water and then with an ammonium sulfate aqueous solution at a temperature of 40° C. to 80° C. Then, the product is again washed with water at a temperature of 40° C. to 95° C. and dried at a temperature of 100° C. to 180° C. for 30 minutes to obtain an ammonium-exchanged Y-type zeolite. Subsequently, a hydrogen type Y-type zeolite is prepared by calcining the above ammonium-exchanged Y-type zeolite at 500° C. to 800° C. for 10 minutes to 10 hours in a saturated vapor atmosphere. Iterations of this process increase the amount of ammonium contained on the Y-type zeolite. In this respect, the final ammonium ion exchange rate may be 90% or more.

To provide a FS-USY zeolite, the USY zeolite prepared as above is first calcined at 500° C. to 700° C., for instance at 550° C. to 650° C., for 30 minutes to 10 hours. If the calcining temperature of the USY zeolite is lower than 500° C., a lower quantity of zirconium atoms and/or titanium atoms and/or hafnium tends to be incorporated when carrying out framework substitution treatment in subsequent steps relative to processes where calcining is carried out at 500° C. to 700° C. However, if the calcining temperature exceeds 700° C., the specific surface area of the USY zeolite may be lowered, and a lower quantity of zirconium atoms and/or titanium atoms and/or hafnium atoms tends to be incorporated when carrying out framework substitution treatment in subsequent steps relative to processes where calcining is carried out at 500° C. to 700° C. Calcining may take place in various atmospheres including, but not limited to, air.

The calcined USY zeolite may then be suspended in water having a temperature of about 20° C. to about 30° C. to form a USY zeolite suspension. The liquid/solid mass ratio for this suspension may be in the range of 5 to 15. For example, the liquid/solid mass ratio may be 8 to 12.

Next, an inorganic acid or an organic acid may be added to the suspension to give an acidified USY zeolite suspension. Exemplary acids include, but are not limited to, sulfuric acid, nitric acid, hydrochloric acid, carboxylic acids, and mixtures of two or more thereof. Advantageously, the acid may be used to adjust the pH of the suspension to less than 2, e.g. from 1 to 2. It has been observed that a pH in the above range may prevent precipitation upon mixing an aqueous solution of the zirconium compound and/or an aqueous solution of the titanium compound and/or an aqueous solution of the hafnium compound with the suspension for the framework substitution treatment discussed further below.

A solution containing a zirconium compound and/or a titanium compound and/or a hafnium compound may be added to the acidified suspension and mixed. The addition of the zirconium compound and/or the titanium compound and/or the hafnium compound may be performed gradually, for instance by dropwise addition. The mixing may take place at room temperature, i.e., from about 25° C. to about 35° C., for from three to five hours. Then, the mixed solution may be neutralized to a pH of 7 to 7.5 by adding a base and dried at 80° C. to 180° C., resulting in the FS-USY zeolite in which zirconium atoms and/or titanium atoms and/or hafnium atoms form a part of the zeolite framework by replacing aluminum atoms that were previously part of the zeolite framework. Exemplary bases include, but are not limited to, aqueous ammonia.

In embodiments, exemplary zirconium compounds include, but are not limited to, zirconium sulfate, zirconium nitrate, zirconium chloride, and combinations of two or more thereof. In embodiments, the amount of the zirconium compound added may be from 0.1% to 5% by mass on a zirconium oxide basis with respect to the mass of the USY zeolite used. For example, from 0.2% to 4% by mass zirconium compound may be added. The addition of the zirconium compound in an amount of less than 0.1% by mass fails to achieve the desired USY zeolite properties. The addition of the zirconium compound in an amount exceeding 5% by mass may cause clogging of pores of the zeolite. In embodiments, an aqueous solution of a zirconium compound prepared by dissolving the zirconium compound in water may be used as the zirconium compound.

In embodiments, exemplary titanium compounds include, but are not limited to, titanium sulfate, titanium acetate, titanium chloride, titanium nitrate, titanium lactate, and combinations of two or more thereof. In embodiments, the amount of titanium compound added may be from 0.1% to 5% by mass on a titanium oxide basis with respect to the mass of the USY zeolite used. For example, from 0.2% to 4% by mass titanium compound may be added. The addition of the titanium compound in an amount of less than 0.1% by mass fails to achieve the desired USY zeolite properties. The addition of the titanium compound in an amount exceeding 5% by mass may cause clogging of pores of the zeolite. In embodiments, an aqueous solution of a titanium compound prepared by dissolving the titanium compound in water may be used as the titanium compound.

In embodiments, exemplary hafnium compounds include, but are not limited to, hafnium chloride, hafnium nitrate, hafnium fluoride, hafnium bromide, hafnium oxalate and the like. In embodiments, the amount of hafnium compound added may be from 0.1% to 5% by mass on a hafnium oxide basis with respect to the mass of the USY zeolite used. For example, from 0.2% to 4% by mass hafnium compound may be added. The addition of the hafnium compound in an amount of less than 0.1% by mass fails to achieve the desired USY zeolite properties. The addition of the hafnium compound in an amount exceeding 5% by mass may cause clogging of pores of the zeolite and may also increase the cost of the catalyst significantly. In embodiments, an aqueous solution of a hafnium compound prepared by dissolving the hafnium compound in water is suitably used as the hafnium compound.

A FS-USY zeolite prepared as described above may then be impregnated with the hydrogenative metal component by conventional methods. For instance, the hydrogenative metal component may include iron, cobalt, nickel, rhodium, palladium, silver, iridium, platinum, gold, chromium, molybdenum, tungsten, or a combination of two or more thereof.

In another aspect, a method for hydrocracking hydrocarbon oil includes contacting at least one hydrocarbon oil stream with at least one hydrocracking catalyst composition and hydrogen in a reactor in order to hydrocrack the hydrocarbon oil stream. The hydrocracking catalyst may be as described above. That is, the hydrocracking catalyst may include a catalyst support and at least one hydrogenative metal component disposed on the catalyst support. The catalyst support may include at least one FS-USY zeolite having an average crystallite size from 5 µm to 50 µm, from 6 µm to 50 µm, from 7 µm to 50 µm, from 8 µm to 50 µm, from 9 µm to 50 µm, from 10 µm to 50 µm, from 11 µm to 50 µm, from 12 µm to 50 µm, from 13 µm to 50 µm, from 14 µm to 50 µm, from 15 µm to 50 µm, from 16 µm to 50 µm, from 17 µm to 50 µm, from 18 µm to 50 µm, from 19 µm to 50 µm, from 20 µm to 50 µm, from 21 µm to 50 µm, from 22 µm to 50 µm, from 23 µm to 50 µm, from 24 µm to 50 µm, from 25 µm to 50 µm, from 26 µm to 50 µm, from 27 µm to 50 µm, from 28 µm to 50 µm, from 29 µm to 50 µm, from 30 µm to 50 µm, from 5 µm to 49 µm, from 5 µm to 48 µm, from 5 µm to 47 µm, from 5 µm to 46 µm, from 5 µm to 45 µm, from 5 µm to 44 µm, from 5 µm to 43 µm, from 5 µm to 42 µm, from 5 µm to 41 µm, from 5 µm to 40 µm, from 5 µm to 39 µm, from 5 µm to 38 µm, from 5 µm to 37 µm, from 5 µm to 36 µm, from 5 µm to 35 µm, from 5 µm to 34 µm, from 5 µm to 33 µm, from 5 µm to 32 µm, from 5 µm to 30 µm, from 5 µm to 29 µm, from 5 µm to 28 µm, from 5 µm to 27 µm, from 5 µm to 26 µm, from 5 µm to 25 µm, from 10 µm to 20 µm, from 11 µm to 19 µm, from 12 µm to 18 µm, from 13 µm to 17 µm, or even from 14 µm to 16 µm.

The reactor may operate within a temperature range from 300° C. to 500° C. For example, the reactor may operate within a temperature range from 310° C. to 490° C., from 320° C. to 480° C., from 330° C. to 470° C., from 340° C. to 460° C., from 350° C. to 450° C., from 360° C. to 440° C., from 370° C. to 430° C., from 380° C. to 420° C., from 390° C. to 410° C., or even from 395° C. to 405° C. It should be understood that the reactor may operate within a temperature range formed from any one of the lower bounds of such temperature described herein and any one of the upper bounds of such temperature described herein.

The hydrocarbon oil may have a boiling point from 375° C. to 833° C. For example, the hydrocarbon oil may have a boiling point from 400° C. to 800° C., from 450° C. to 750° C., from 500° C. to 700° C., from 550° C. to 650° C., or even from 575° C. to 625° C. It should be understood that the hydrocarbon oil may have a boiling point within a temperature range formed from any one of the lower bounds of such temperature described herein and any one of the upper bounds of such temperature described herein.

Hydrogen may be used to produce saturated hydrocarbons during the hydrocracking process. The hydrogen may be added to the reactor at a pressure from 3.5 MPa to 25 MPa. For example, the hydrogen may be added to the reactor at a pressure from 4 MPa to 24.5 MPa, from 4.5 MPa to 24 MPa, from 5 MPa to 23.5 MPa, from 5.5 MPa to 23 MPa, from 6

MPa to 22.5 MPa, from 6.5 MPa to 22 MPa, from 7 MPa to 21.5 MPa, from 7.5 MPa to 21 MPa, from 8 MPa to 20.5 MPa, from 8.5 MPa to 20 MPa, from 9 MPa to 19.5 MPa, from 9.5 MPa to 19 MPa, from 10 MPa to 18.5 MPa, from 10.5 MPa to 18 MPa, from 11 MPa to 17.5 MPa, from 11.5 MPa to 17 MPa, from 12 MPa to 16.5 MPa, from 12.5 MPa to 16 MPa, from 13 MPa to 15.5 MPa, from 13.5 MPa to 15 MPa, or even from 14 MPa to 14.5 MPa. It should be understood that the hydrogen may be added to the reactor in a range of pressure from any one of the lower bounds of such pressure described herein to any one of the upper bounds of such pressure described herein. Without intending to be bound by any particular theory, it is believed that the process performance will be significantly reduced at lower hydrogen pressure. Conversely, it is believed that processes using high hydrogen pressure require specialized equipment that may significantly increase the cost of the process.

The hydrogen feed and hydrocarbon oil feeds may be adjusted such that the hydrogen/oil ratio in the reactor may be from 500 normal cubic meters per cubic meter (hereinafter "$Nm^3/m^3$") to 2500 $Nm^3/m^3$, with normal cubic meters being defined as the volume in cubic meters at standard temperature and pressure (15° C. and 0.1 MPa). For example, the hydrogen/oil ratio may be from 550 $Nm^3/m^3$ to 2450 $Nm^3/m^3$, from 600 $Nm^3/m^3$ to 2400 $Nm^3/m^3$, from 650 $Nm^3/m^3$ to 2350 $Nm^3/m^3$, from 700 $Nm^3/m^3$ to 2300 $Nm^3/m^3$, from 750 $Nm^3/m^3$ to 2250 $Nm^3/m^3$, from 800 $Nm^3/m^3$ to 2200 $Nm^3/m^3$, from 850 $Nm^3/m^3$ to 2150 $Nm^3/m^3$, from 900 $Nm^3/m^3$ to 2100 $Nm^3/m^3$, from 950 $Nm^3/m^3$ to 2050 $Nm^3/m^3$, from 1000 $Nm^3/m^3$ to 2000 $Nm^3/m^3$, from 1050 $Nm^3/m^3$ to 1950 $Nm^3/m^3$, from 1100 $Nm^3/m^3$ to 1900 $Nm^3/m^3$, from 1150 $Nm^3/m^3$ to 1850 $Nm^3/m^3$, from 1200 $Nm^3/m^3$ to 1800 $Nm^3/m^3$, from 1250 $Nm^3/m^3$ to 1750 $Nm^3/m^3$, from 1300 $Nm^3/m^3$ to 1700 $Nm^3/m^3$, from 1250 $Nm^3/m^3$ to 1650 $Nm^3/m^3$, from 1300 $Nm^3/m^3$ to 1500 $Nm^3/m^3$, or even from 1350 $Nm^3/m^3$ to 1450 $Nm^3/m^3$. It should be understood that the hydrogen/oil ratio may be in a range of ratios from any one of the lower bounds of such ratio described herein to any one of the upper bounds of such ratio described herein. Without intending to be bound by any particular theory, it is believed that the process performance will be significantly reduced at a lower hydrogen/oil ratio. Conversely, it is believed that processes using a high hydrogen/oil ratio require specialized equipment that may significantly increase the cost of the process and may increase the gas holdup in the system thereby decreasing process performance.

The liquid hourly space velocity (hereinafter "LHSV") of the hydrocarbon feed in the reactor may be from 0.1 per hour to 10 per hour. For example, the liquid hourly space velocity may be from 0.5 per hour to 9.5 per hour, from 1 per hour to 9 per hour, from 1.5 per hour to 8.5 per hour, from 2 per hour to 8 per hour, from 2.5 per hour to 7.5 per hour, from 3 per hour to 7 per hour, from 3.5 per hour to 6.5 per hour, from 4 per hour to 6 per hour, or even from 4.5 per hour to 5.5 per hour. It should be understood that the LHSV may be in a range formed from any one of the lower bounds for the LHSV described herein to any one of the upper bounds for the LHSV described herein.

As noted above, the method for hydrocracking may take place in one or more reactors. Continuous flow reactors are well-suited for this process, although the subject matter described herein is not so limited. Exemplary continuous flow reactors include, but are not limited to, a stirred tank reactor, an ebullated bed reactor, a baffled slurry tank, a fixed bed reactor, a rotating tubular reactor, a slurry-bed reactor, a moving-bed reactor, and a combination of two or more of these.

According to an aspect, either alone or in combination with any other aspect, a catalyst composition includes at least one hydrogenative metal component and a support. The support comprises a framework-substituted ultra-stable Y-type (USY) zeolite substituted with zirconium atoms, titanium ions, or both zirconium atoms and titanium atoms. The framework-substituted USY zeolite has an average crystallite size from 5 μm to 50 μm.

According to a second aspect, either alone or in combination with any other aspect, the framework-substituted ultra-stable Y-type zeolite is substituted with 0.1-5 mass % zirconium atoms on an oxide basis.

According to a third aspect, either alone or in combination with any other aspect, the framework-substituted ultra-stable Y-type zeolite is substituted with 0.1-5 mass % titanium calculated on an oxide basis.

According to a fourth aspect, either alone or in combination with the third aspect, the framework-substituted ultra-stable Y-type zeolite is substituted with 0.1-5 mass % zirconium atoms on an oxide basis.

According to a fifth aspect, either alone or in combination with any other aspect, the framework-substituted ultra-stable Y-type zeolite comprises hafnium atoms.

According to a sixth aspect, either alone or in combination with the fifth aspect, the framework-substituted ultra-stable Y-type zeolite is further substituted with the hafnium atoms.

According to a seventh aspect, either alone or in combination with any other aspect, the catalyst composition further includes an inorganic oxide compound.

According to an eighth aspect, either alone or in combination with the seventh aspect, the inorganic oxide compound comprises alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, or a combination of two or more thereof.

According to a ninth aspect, either alone or in combination with any other aspect, the at least one hydrogenative metal component comprises from 0.01 mass % to 40 mass % of the catalyst composition.

According to a tenth aspect, either alone or in combination with any other aspect, the framework-substituted ultra-stable Y-type zeolite comprises a crystal lattice constant from 2.42 nm to 2.45 nm, a specific surface area from 600 $m^2/g$ to 900 $m^2/g$, and a molar ratio of $SiO_2$ to $Al_2O_3$ from 5 to 100.

According to a eleventh aspect, either alone or in combination with any other aspect, the catalyst composition comprises a specific surface area from 200 $m^2/g$ to 450 $m^2/g$ and a plurality of pores having a diameter of 600 Å or less, the pores having a volume from 0.4 ml/g to 0.75 ml/g, and wherein the at least one hydrogenative metal component comprises from 0.01 mass % to 40 mass % of the catalyst composition.

According to an twelfth aspect, either alone or in combination with any other aspect, the at least one hydrogenative metal component is selected from the group consisting of iron, cobalt, nickel, rhodium, palladium, silver, iridium, platinum, gold, chromium, molybdenum, tungsten, and a combination of two or more thereof.

According to a thirteenth aspect, either alone or in combination with any other aspect, the framework-substituted USY zeolite has an average crystallite size from 10 μm to 20 μm.

According to a fourteenth aspect, either alone or in combination with any other aspect, the catalyst composition further includes an inorganic oxide compound selected from the group consisting of alumina, silica, and a mixture of alumina and silica; and wherein the at least one hydrogenative metal component is selected from the group consisting of iron, cobalt, nickel, rhodium, palladium, silver, iridium, platinum, gold, chromium, molybdenum, tungsten, and a combination of two or more thereof.

According to a fifteenth aspect, either alone or in combination with any other aspect, a method of making a catalyst composition includes forming an ultra-stable Y-type (USY) zeolite having an average crystallite size from 5 µm to 50 µm; heating the USY zeolite at a temperature from 500° C. to 700° C.; forming a suspension comprising the USY zeolite, the suspension having a liquid/solid ratio from 5 to 15; adding at least one inorganic acid, at least one organic acid, or a mixture of at least one inorganic acid and at least one organic acid to the suspension such that the suspension comprises a pH less than or equal to 2; mixing a zirconium compound, a titanium compound, a hafnium compound, or a mixture of two or more thereof with the suspension comprising a pH less than or equal to 2; and adding a base such that the suspension comprises a pH from 6 to 8 to afford a framework-substituted USY zeolite.

According to a sixteenth aspect, either alone or in combination with any other aspect, the ultra-stable Y-type zeolite comprising a crystal lattice constant from 2.42 nm to 2.45 nm, a specific surface area from 600 $m^2/g$ to 900 $m^2/g$, and a molar ratio of $SiO_2$ to $Al_2O_3$ from 5 to 100 in the method.

According to a seventeenth aspect, either alone or in combination with any other aspect, the method further includes adding at least one hydrogenative metal to the catalyst composition.

According to an eighteenth aspect, either alone or in combination with any other aspect, the at least one hydrogenative metal component is selected from the group consisting of iron, cobalt, nickel, rhodium, palladium, silver, iridium, platinum, gold, chromium, molybdenum, tungsten, and a combination of two or more thereof in the method.

According to a nineteenth aspect, either alone or in combination with any other aspect, the at least one hydrogenative metal is added such that the at least one hydrogenative metal comprises from 0.01 mass % to 40 mass % of the catalyst composition in the method.

According to a twentieth aspect, either alone or in combination with any other aspect, the framework-substituted USY zeolite has an average crystallite size from 10 µm to 20 µm in the method.

According to a twenty-first aspect, either alone or in combination with any other aspect, the method further includes adding an inorganic oxide compound selected from the group consisting of alumina, silica, and a mixture of alumina and silica; and adding at least one hydrogenative metal component selected from the group consisting of iron, cobalt, nickel, rhodium, palladium, silver, iridium, platinum, gold, chromium, molybdenum, tungsten, and a combination of two or more thereof.

According to a twenty-second aspect, either alone or in combination with any other aspect, a method for hydrocracking hydrocarbon oil includes contacting the hydrocarbon oil with at least one catalyst composition and hydrogen in a reactor in order to hydrocrack the hydrocarbon oil. The catalyst composition includes at least one hydrogenative metal component and a support. The support comprises a framework-substituted ultra-stable Y-type (USY) zeolite substituted with zirconium atoms, titanium ions, or both zirconium atoms and titanium atoms. The framework-substituted USY zeolite has an average crystallite size from 5 µm to 50 µm.

According to a twenty-third aspect, either alone or in combination with any other aspect, the hydrocracking is performed at a temperature from 300° C. to 500° C.

According to a twenty-fourth aspect, either alone or in combination with any other aspect, the reactor is a continuous flow reactor, the hydrocarbon stream has a boiling point from 375° C. to 833° C.; the hydrogen is added to the reactor at a pressure from 3.5 MPa to 25 MPa; the reactor has a liquid hourly space velocity from 0.1 per hour to 10 per hour; and the reactor has a hydrogen/oil ratio from 500 $Nm^3/m^3$ to 2500 $Nm^3/m^3$.

According to a twenty-fifth aspect, either alone or in combination with any other aspect, the method further includes collecting distillates from the reactor.

According to a twenty-sixth aspect, either alone or in combination with any other aspect, the reactor comprises a continuous flow reactor selected from the group consisting of a stirred tank reactor, an ebullated bed reactor, a baffled slurry tank, a fixed bed reactor, a moving bed reactor, a rotating tubular reactor, a slurry-bed reactor, and a combination of two or more of these.

According to a twenty-seventh aspect, either alone or in combination with any other aspect, the hydrocarbon oil comprises refined oil obtained from crude oil, synthetic crude oil, bitumen, oil sand, shale oil, coal oil, or a combination of two or more thereof.

According to a twenty-eighth aspect, either alone or in combination with any other aspect, the refined oil comprises vacuum gas oil, deasphalted oil, demetallized oil, light coker gas oil, heavy coker gas oil, cycle oil obtained from a fluid catalytic cracking process, gas oil obtained from a visbreaking process, or a combination of two or more thereof.

According to a twenty-ninth aspect, either alone or in combination with any other aspect, the framework-substituted USY zeolite has an average crystallite size from 10 µm to 20 µm.

Examples

Using embodiments described above, an exemplary catalyst composition was prepared and characterized, as follows.

Synthesis of Y-Type Zeolites

Conventionally Sized Y-Type Zeolites (NaY):

An alumina solution was prepared by dissolving 10 g of NaOH in 20 g double distilled water, followed by slow addition of 0.945 g aluminum powder with 99.5%, purity. A silica solution was prepared by mixing of 50 g colloidal silica (Ludox-HS 30, 30 wt. % $SiO_2$, pH=9.8) with 8.6 g NaOH and 17 g double distilled water. The container was placed in an oven at 100° C. for 6 minutes. The alumina solution was added to the silica solution while mixing in an ice bath. The resulting mixture was kept at room temperature for 24 h to age. Crystallization was conducted at 60° C. for 1500 minutes to provide the conventionally sized NaY zeolite, which is used in the comparative example below.

Large Crystal Y-Type Zeolites:

An alumina solution was prepared by dissolving 10 g of NaOH in 20 g double distilled water, followed by slow addition of 0.945 g aluminum powder with 99.5%, purity. A silica solution was prepared by mixing of 50 g colloidal silica (Ludox-HS 30, 30 wt. % $SiO_2$, pH=9.8) with 8.6 g NaOH and 17 g double distilled water. The container was placed in an oven at 100° C. for 6 minutes. The alumina solution was added to the silica solution while mixing in an ice bath. The resulting mixture was kept at room temperature for 24 h to age. The crystallization was conducted at 100° C. for 330 minutes to provide the large crystal NaY zeolite.

Measurement of Crystallite Size

Figure 1:
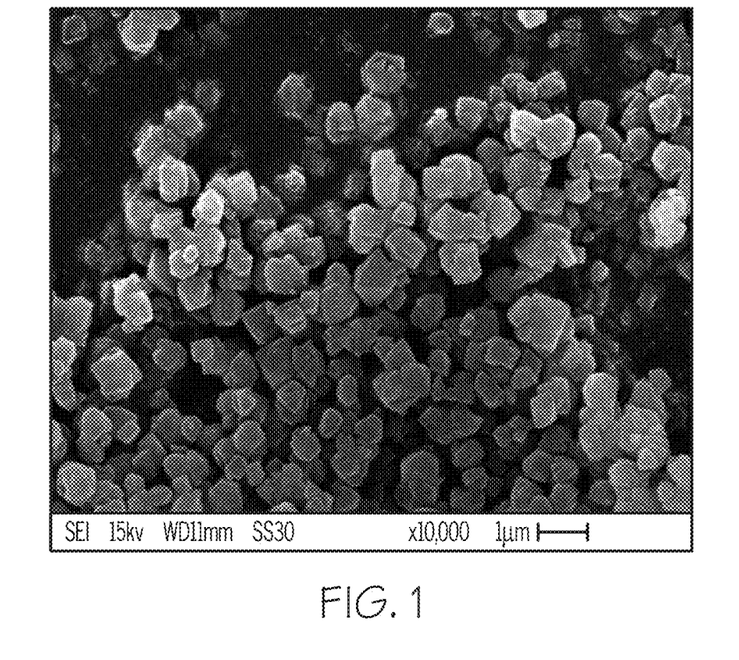
FIG. 1 depicts an SEM image of the conventionally sized NaY zeolite at 10,000× magnification.
Figure 2:
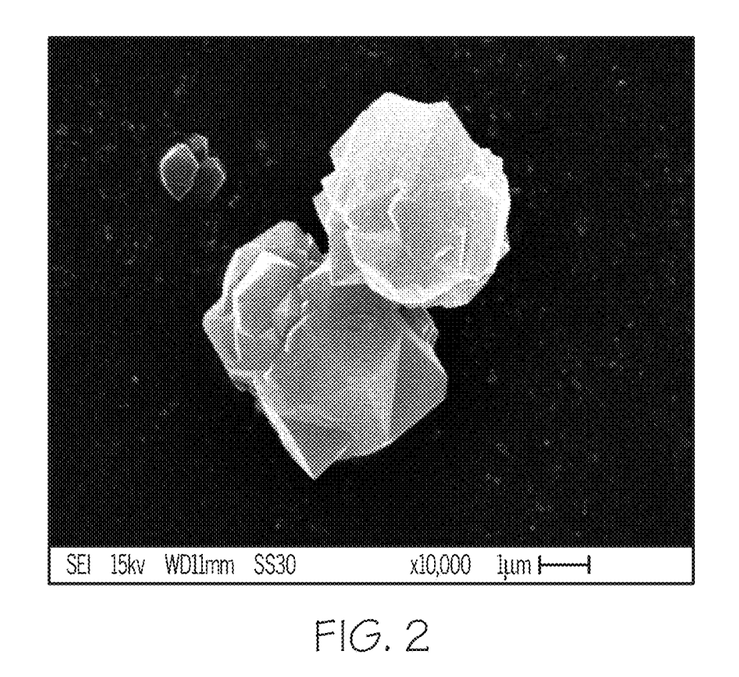
FIG. 2 depicts an SEM image of the large crystal NaY zeolite at 10,000× magnification in accordance with one or more embodiments of the present disclosure.
Figure 3:
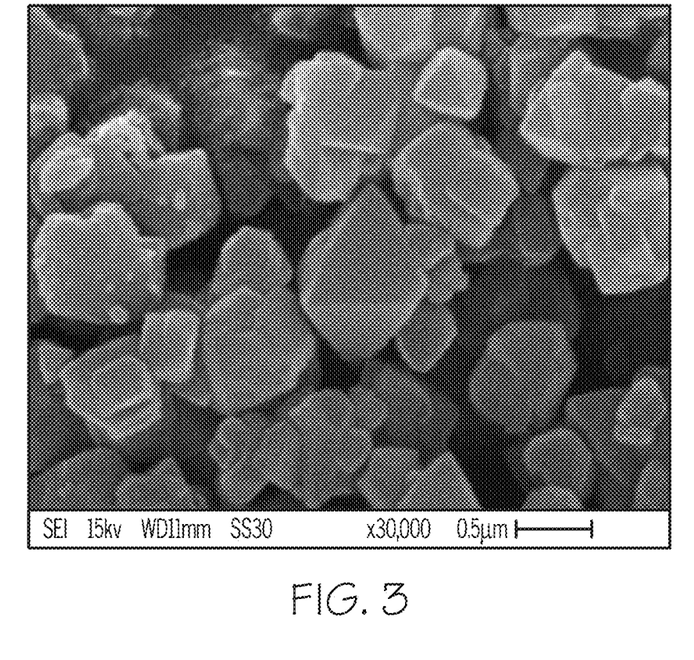
FIG. 3 depicts an SEM image of the conventionally sized NaY zeolite at 30,000× magnification.
Figure 4:
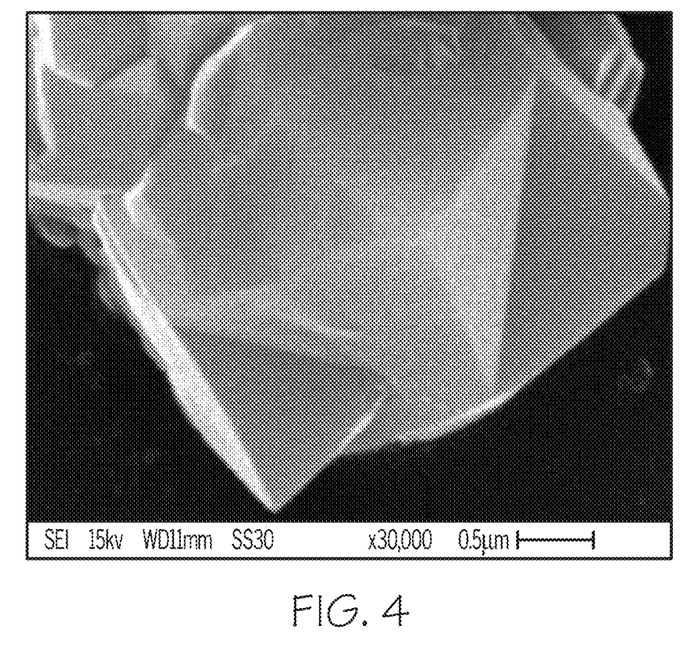
FIG. 4 depicts an SEM image of the large crystal NaY zeolite at 30,000× magnification in accordance with one or more embodiments of the present disclosure.
Figure 5:
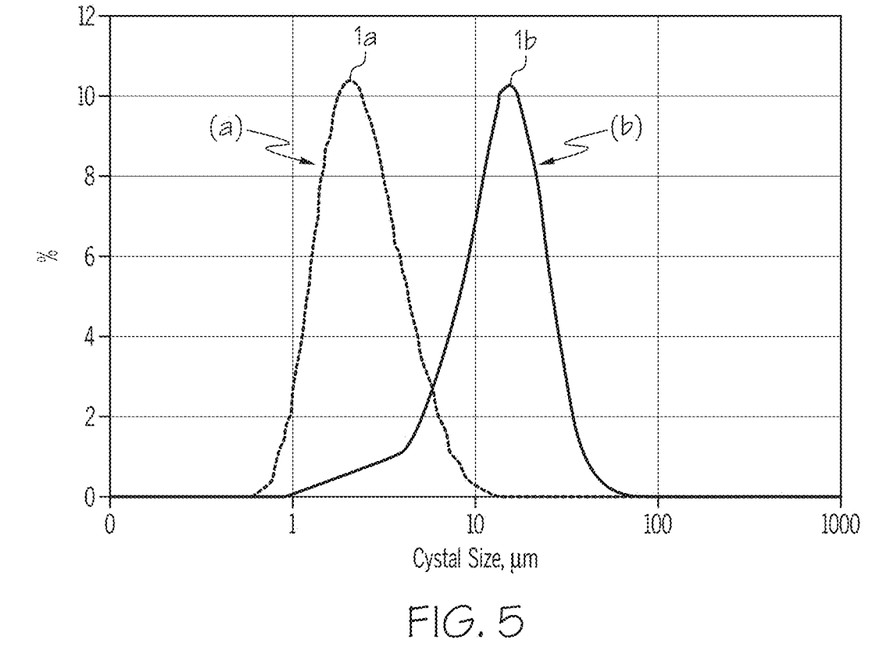
FIG. 5 depicts a crystallite size distribution curve for the conventionally sized NaY zeolite and the large crystal NaY zeolite.

Scanning electron microscopy (SEM) images were taken of the conventionally sized NaY zeolite and the large crystal NaY zeolite. FIG. 1 shows the SEM image of the conventionally sized NaY zeolite at 10,000× magnification. FIG. 2 shows the SEM image of the large crystal NaY zeolite at 10,000× magnification. FIG. 3 shows the SEM image of the conventionally sized NaY zeolite at 30,000× magnification. FIG. 4 shows the SEM image of the large crystal NaY zeolite at 30,000× magnification. Qualitatively, all figures showed a substantial difference in zeolite crystallite size between the conventionally sized NaY zeolite and the large crystal NaY zeolite. Quantitatively, FIG. 5 shows the crystallite size distribution curve for the conventionally sized NaY zeolite (a) and the large crystal NaY zeolite (b). The peak 1a of distribution curve (a) is at about 2 µm, while the peak 1b of distribution curve (b) is at about 15 µm.

Post Modification of NaY Zeolites

Both the conventionally sized NaY zeolite and the large crystal NaY zeolite were then subjected to post-modification by dealumination and then inserting titanium and zirconium into the framework of the zeolite, as described in U.S. Pat. No. 10,293,332, the entire content of which is incorporated herein by reference, to provide a conventionally sized titanium-zirconium framework-substituted ultrastable Y-type ("TiZr-USY") zeolite and a large crystal TiZr-USY zeolite, respectively.

The NaY zeolite is first subjected to exchange of sodium ions with ammonium ions by a conventional method. In one exemplary method, the Y-type zeolite is dispersed in water to prepare a suspension, to which ammonium sulfate is added. The solid matter is then washed with water, followed by an ammonium sulfate aqueous solution of a temperature of 40° C. to 80° C. Then, the solid is further washed with water at 40° to 95° C. and dried at 100° C. to 180° C. for 30 minutes, thus producing an ammonium-exchanged Y-type zeolite in which 50% to 70% of sodium contained in the Y-type zeolite is substituted with $NH_4$.

Subsequently, a hydrogen type Y-type zeolite (HY) is prepared by calcining the above ammonium-exchanged Y-type zeolite at 500° C. to 800° C. for 10 minutes to 10 hours in a saturated vapor atmosphere. Then, an ammonium-exchanged Y-type zeolite in which 80% to 97% of sodium contained in the initial NaY zeolite is ion-exchanged with $NH_4$ can be obtained by dispersing the HY zeolite obtained above in water at 40° C. to 95° C. to prepare a suspension, to which ammonium sulfate is added. The suspension is stirred at 40° C. to 95° C. for 10 minutes to 3 hours. The solid matter is then washed with water at 40° C. to 95° C., followed by an ammonium sulfate aqueous solution at 40° C. to 95° C. Then, the solid is further washed with water at 40° C. to 80° C. and dried at 100° C. to 180° C. for 30 minutes to 30 hours. In this respect, the final ammonium ion exchange rate is at least 90%.

The ammonium-exchanged Y zeolite thus obtained is calcined at 500° C. to 700° C. for 10 minutes to 10 hours in, for example, a saturated vapor atmosphere, to provide an USY zeolite.

The USY zeolite is then subjected to a treatment for removing extra-skeletal aluminum (aluminum atoms which do not form the zeolite framework). Extra-skeletal aluminum can be removed by, for example, dispersing the USY zeolite described above in warm water at 40° C. to 95° C. to prepare a suspension, adding sulfuric acid to the above suspension, and stirring the suspension for 10 minutes to 3 hours while maintaining the temperature at 40° C. to 95° C. to thereby dissolve the extra-skeletal aluminum. After dissolving the extra-skeletal aluminum, the suspension is filtered, and the filter residue is washed with purified water at 40° C. to 95° C. and dried at 100° C. to 180° C. for 3 to 30 hours. An USY zeolite from which the extra-skeletal aluminum is removed is thus obtained.

The USY zeolite from which the extra-skeletal aluminum is removed is calcined at 500° C. to 700° C. for 30 minutes to 10 hours. The calcined ultra-stable Y-type zeolite is suspended in water having a temperature of about 20° C. to about 30° C. to form a suspension with a liquid/solid mass ratio in the range of 5 to 15. Next, an inorganic acid or an organic acid is added so that a pH of the suspension is less than 2, and subsequently a solution containing a zirconium compound and a titanium compound is added gradually and mixed. The mixed solution is then neutralized (pH 7.0 to 7.5) and dried at 80° C. to 180° C., thus providing the TiZr-USY zeolite.

Formulation of Catalyst Compositions

Catalyst Composition 1 (Comparative) was formulated using 30 wt. % conventionally sized TiZr-USY zeolite and 70 wt. % alumina-only binder. Catalyst Composition 2 (inventive) was formulated using 30 wt. % large crystallite size TiZr-USY zeolite and 70 wt. % alumina-only binder. The combined TiZr-USY zeolite and binder are referred to as the "carrier." Both Catalyst Composition 1 and Catalyst Composition 2 had 16 wt. % molybdenum trioxide and 4 wt. % nickel oxide calculated as components of the carrier.

Pilot Plant Hydrocracking Process

Catalyst Composition 1 and Catalyst Composition 2 were both used in a hydrocracking process with a vacuum gas oil (VGO) feed. The VGO had a density of 0.9203 $g/cm^3$ at 15° C., a sulfur content of 2.231 wt. %, and a nitrogen content of 815 ppm (by weight). The initial boiling point of the feed was 190° C., 10 wt. % of the VGO feed boiled by 366° C., 30 wt. % of the VGO feed boiled by 424° C., 50 wt. % of the VGO feed boiled by 462° C., 70 wt. % of the VGO feed boiled by 500° C., and 90 wt. % of the VGO feed boiled by 480° C. The final boiling point was 580° C.

For the hydrocracking process, a pilot plant with two reactors connected in series was used. Two sets of experiments were performed: (1) using large crystallite size zeolite catalyst (Catalyst Composition 2); (2) using conventionally sized catalyst (Catalyst Composition 1). The first reactor was loaded with 112.5 ml of a commercial pretreat catalyst, an amorphous silica-alumina catalyst with Ni and W as active phase metals, followed by 112.5 ml of Catalyst Composition 1. The second reactor was loaded with a commercial hydrocracking catalyst, a 15 wt. % zeolite and 85 wt. % silica-alumina-containing catalyst with Ni and W as active phase metals. Hydrogen was added to the pilot plant at a partial pressure of 11.5 MPa (115 bar) with a hydrogen/oil ratio of 1263 $Nm^3/m^3$ (1263 StLt/Lt) and an overall LHSV of 0.326 per hour. Reactions were performed using Catalyst Composition 1 in the first reactor at 360.8° C., 371.1° C., and 381.3° C., and commercial hydrocracking catalysts, a 15 wt. % zeolite and 85 wt. % silica-alumina-containing catalyst with Ni and W as active phase metals, in the second reactor at 350.6° C., 359.7° C., and 370.1° C., sequentially without cooling between increases. In experiment 2, the first reactor was loaded with 112.5 ml of a commercial pretreat catalyst, an amorphous silica-alumina catalyst with Ni and W as active phase metals, followed by 112.5 ml of the Catalyst Composition 2. The second reactor was loaded with a commercial hydrocracking catalyst, a 15 wt. % zeolite and 85 wt. % silica-alumina containing catalyst having Ni and W active phase metals. Hydrogen was added to the pilot plant at a partial pressure of 11.5 MPa (115 bar) with a hydrogen/oil ratio of 1263 Nm³/m³ (1263 NLt/Lt) and an overall LHSV of 0.326 per hour. Reactions were performed using Catalyst Composition 2 in the first reactor at 361.6° C. and 370.9° C. and commercial hydrocracking catalysts in the second reactor at 351.5° C. and 359.0° C., sequentially without cooling between increases.

Figure 6:
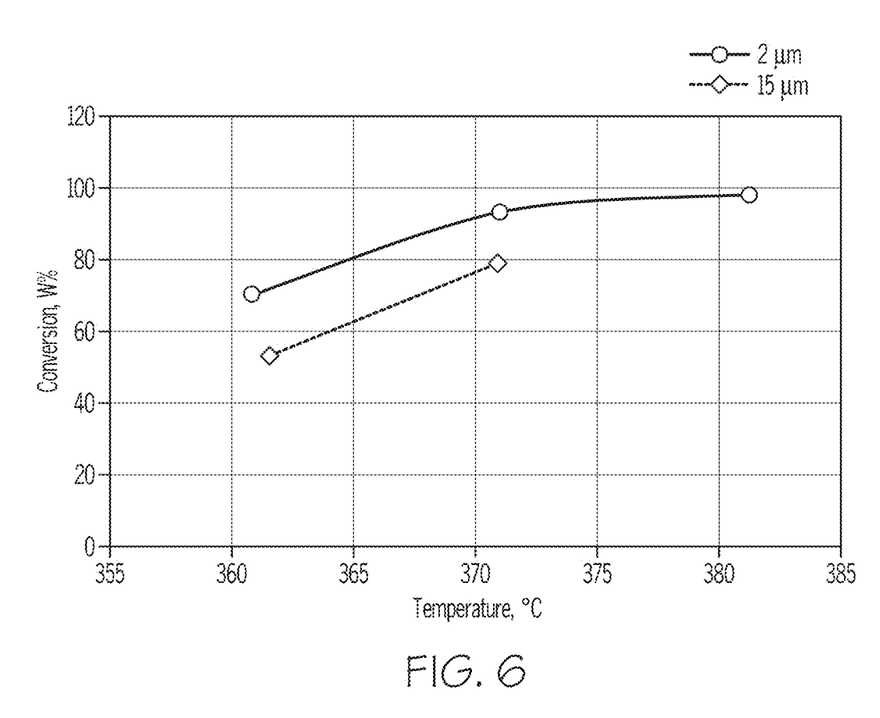
FIG. 6 depicts a chart of VGO feed conversion versus reactor temperature.

FIG. 6 provides a chart of VGO feed conversion versus reactor temperature and Table 2 summarizes this data. As shown in FIG. 6, Catalyst Composition 2, which includes the large crystal USY ("15 μm") zeolite, provides greater conversion at the same temperature than Catalyst Composition 1, which includes a conventionally sized USY ("2 μm") zeolite. Therefore, Catalyst Composition 2 is more active than Catalyst Composition 1.

TABLE 2

VGO Feed conversion versus reactor temperature

| Temperature (° C.) | Conversion (wt. %) | |
| --- | --- | --- |
| | 2 μm | 15 μm |
| 361.6 | 53.5 | |
| 370.9 | 79.1 | |
| 360.8 | | 70.2 |
| 371.1 | | 93.2 |
| 381.3 | | 98.1 |

Figure 7:
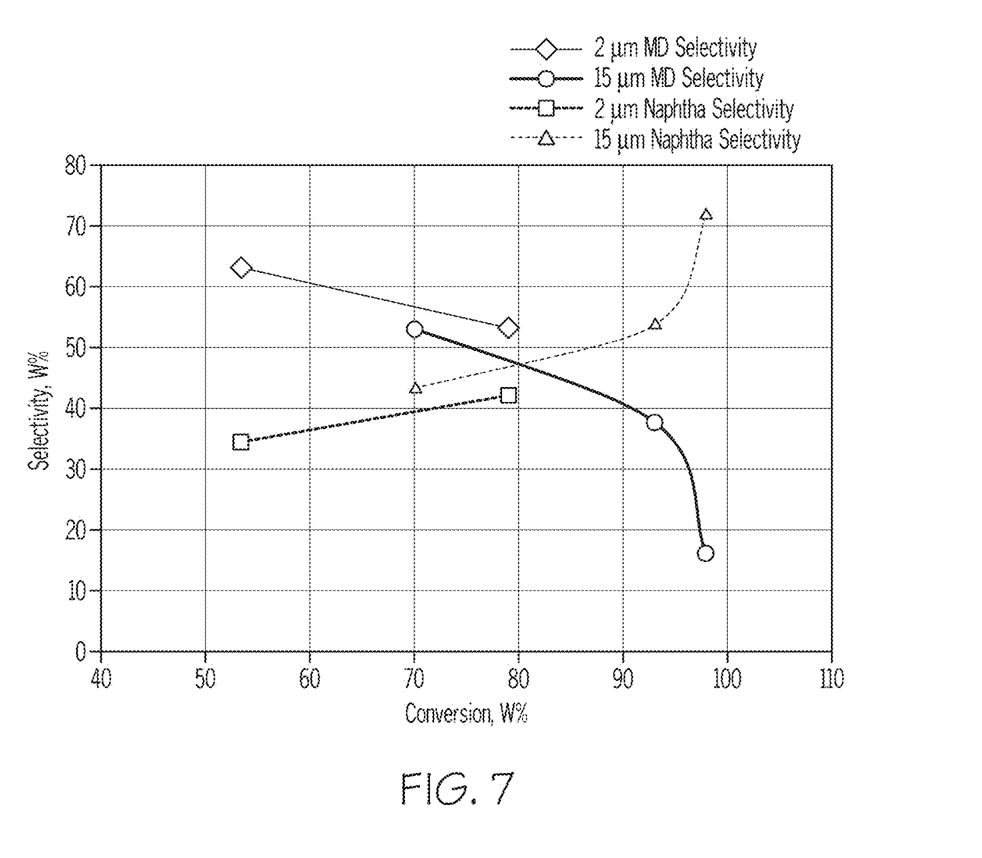
FIG. 7 depicts a chart of middle distillates (MD) and naphtha selectivity versus VGO feed conversion.

FIG. 7 provides a chart of middle distillates (MD) and naphtha selectivity versus VGO feed conversion, and Table 3 summarizes this data. As shown in FIG. 7, Catalyst Composition 2, which includes the large crystal USY ("15 μm") zeolite, provides greater selectivity for naphtha at conversions studied than Catalyst Composition 1, which includes a conventionally sized USY ("2 μm") zeolite. In contrast, Catalyst Composition 2, provides less selectivity for middle distillates than Catalyst Composition 1.

TABLE 3

Middle distillates and naphtha selectivity of catalyst compositions

| Temperature (° C.) | Middle Distillates Selectivity | | Naphtha Selectivity | |
| --- | --- | --- | --- | --- |
| | 2 μm | 15 μm | 2 μm | 15 μm |
| 361.6 | 63.1 | | 34.5 | |
| 370.9 | 53.2 | | 42.1 | |
| 360.8 | — | 52.9 | | 43.4 |
| 371.1 | — | 37.5 | | 54 |
| 381.3 | — | 16 | | 72.1 |

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A catalyst composition comprising:
at least one hydrogenative metal component; and
a support; wherein
the support comprises a framework-substituted ultra-stable Y-type (USY) zeolite substituted with zirconium atoms, titanium atoms, or both zirconium atoms and titanium atoms; and
the framework-substituted USY zeolite has an average crystallite size from 11 μm to 50 μm.

2. The catalyst composition of claim 1, wherein the framework-substituted ultra-stable Y-type zeolite is substituted with 0.1-5 mass % zirconium atoms on an oxide basis, 0.1-5 mass % titanium calculated on an oxide basis, or 0.1-5 mass % zirconium atoms on an oxide basis and 0.1-5 mass % titanium calculated on an oxide basis.

3. The catalyst composition of claim 1, wherein the framework-substituted ultra-stable Y-type zeolite comprises hafnium atoms.

4. The catalyst composition of claim 1, further comprising an inorganic oxide compound wherein the inorganic oxide compound comprises alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, silica-alumina-zirconia, or a combination of two or more thereof.

5. The catalyst composition of claim 1, wherein the at least one hydrogenative metal component comprises from 0.01 mass % to 40 mass % of the catalyst composition.

6. The catalyst composition of claim 1, wherein the framework-substituted ultra-stable Y-type zeolite comprises a crystal lattice constant from 2.42 nm to 2.45 nm, a specific surface area from 600 m²/g to 900 m²/g, and a molar ratio of $SiO_2$ to $Al_2O_3$ from 5 to 100.

7. The catalyst composition of claim 1, wherein the catalyst composition comprises a specific surface area from 200 m²/g to 450 m²/g and a plurality of pores having a diameter of 600 Å or less, the pores having a volume from 0.4 ml/g to 0.75 ml/g.

8. The catalyst composition of claim 1, wherein the at least one hydrogenative metal component is selected from the group consisting of iron, cobalt, nickel, rhodium, palladium, silver, iridium, platinum, gold, chromium, molybdenum, tungsten, and a combination of two or more thereof.

9. The catalyst composition of claim 1, wherein the framework-substituted USY zeolite has an average crystallite size from 11 μm to 20 μm.

10. The catalyst composition of claim 1, further comprising an inorganic oxide compound selected from the group consisting of alumina, silica, and a mixture of alumina and silica; and wherein the at least one hydrogenative metal component is selected from the group consisting of iron, cobalt, nickel, rhodium, palladium, silver, iridium, platinum, gold, chromium, molybdenum, tungsten, and a combination of two or more thereof.

11. A method of making a catalyst composition, the method comprising:
    forming an ultra-stable Y-type (USY) zeolite having an average crystallite size from 11 μm to 50 μm;
    heating the USY zeolite at a temperature from 500° C. to 700° C.;
    forming a suspension comprising the USY zeolite, the suspension having a liquid/solid ratio from 5 to 15;
    adding at least one inorganic acid, at least one organic acid, or a mixture of at least one inorganic acid and at least one organic acid to the suspension such that the suspension comprises a pH less than or equal to 2;
    mixing a zirconium compound, a titanium compound, a hafnium compound, or a mixture of two or more thereof with the suspension comprising a pH less than or equal to 2; and
    adding a base such that the suspension comprises a pH from 6 to 8 to afford a framework-substituted USY zeolite.

12. The method of claim 11, wherein the ultra-stable Y-type zeolite comprises a crystal lattice constant from 2.42 nm to 2.45 nm, a specific surface area from 600 $m^2$/g to 900 $m^2$/g, and a molar ratio of $SiO_2$ to $Al_2O_3$ from 5 to 100.

13. The method of claim 11, further comprising adding at least one hydrogenative metal to the catalyst composition selected from the group consisting of iron, cobalt, nickel, rhodium, palladium, silver, iridium, platinum, gold, chromium, molybdenum, tungsten, and a combination of two or more thereof.

14. The method of claim 11, wherein the at least one hydrogenative metal is added such that the at least one hydrogenative metal comprises from 0.01 mass % to 40 mass % of the catalyst composition.

15. The method of claim 11, wherein the framework-substituted USY zeolite has an average crystallite size from 11 μm to 20 μm.

16. The method of claim 11, further comprising adding an inorganic oxide compound selected from the group consisting of alumina, silica, and a mixture of alumina and silica; and adding at least one hydrogenative metal component selected from the group consisting of iron, cobalt, nickel, rhodium, palladium, silver, iridium, platinum, gold, chromium, molybdenum, tungsten, and a combination of two or more thereof.

17. A method for hydrocracking hydrocarbon oil, comprising:
    contacting the hydrocarbon oil with at least one catalyst composition and hydrogen in a reactor in order to hydrocrack the hydrocarbon oil, the catalyst composition comprising:
        at least one hydrogenative metal component; and
        a support; wherein
            the support comprises a framework-substituted ultra-stable Y-type (USY) zeolite substituted with zirconium atoms, titanium atoms, or both zirconium atoms and titanium atoms; and
            the framework-substituted USY zeolite has an average crystallite size from 11 μm to 50 μm.

18. The method of claim 17, wherein the hydrocracking is performed at a temperature from 300° C. to 500° C.

19. The method of claim 17, wherein the reactor is a continuous flow reactor, the hydrocarbon oil has a boiling point from 375° C. to 833° C.; the hydrogen is added to the reactor at a pressure from 3.5 MPa to 25 MPa; the reactor has a liquid hourly space velocity from 0.1 per hour to 10 per hour; and the reactor has a hydrogen/oil ratio from 500 $Nm^3/m^3$ to 2500 $Nm^3/m^3$.

20. The method of claim 17, wherein the hydrocarbon oil comprises refined oil obtained from crude oil, synthetic crude oil, bitumen, oil sand, shale oil, coal oil, or a combination of two or more thereof, and wherein the refined oil comprises vacuum gas oil, deasphalted oil, demetallized oil, light coker gas oil, heavy coker gas oil, cycle oil obtained from a fluid catalytic cracking process, gas oil obtained from a visbreaking process, or a combination of two or more thereof.

* * * * *